K. J. SPIETH.
WOODWORKING CUTTER.
APPLICATION FILED FEB. 15, 1909.
947,462.
Patented Jan. 25, 1910.
2 SHEETS—SHEET 1.
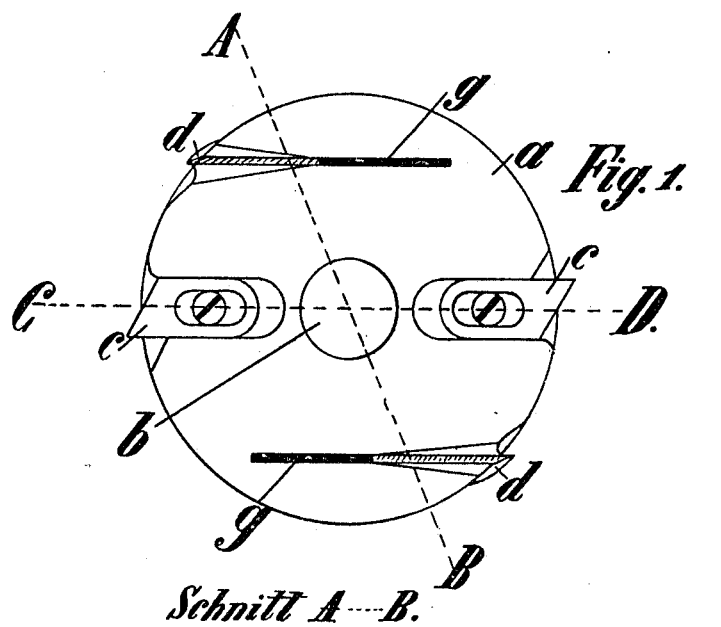
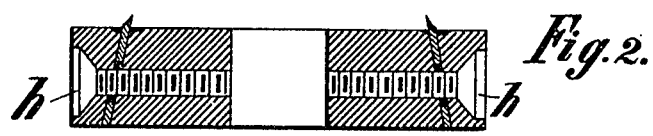
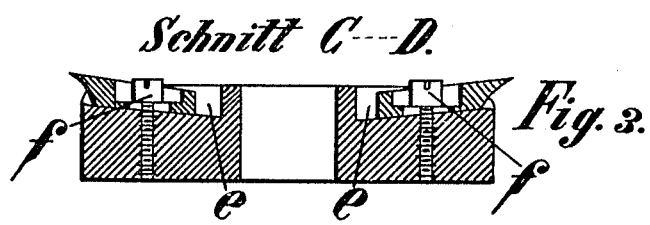
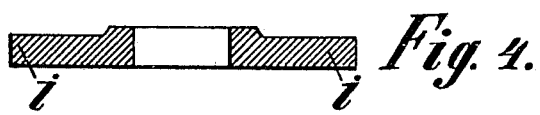

K. J. SPIETH.
WOODWORKING CUTTER.
APPLICATION FILED FEB. 15, 1909.
947,462.
Patented Jan. 25, 1910.
2 SHEETS—SHEET 2.
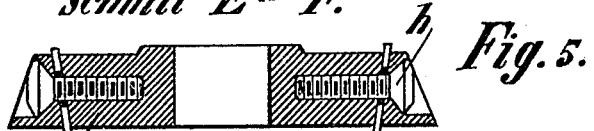
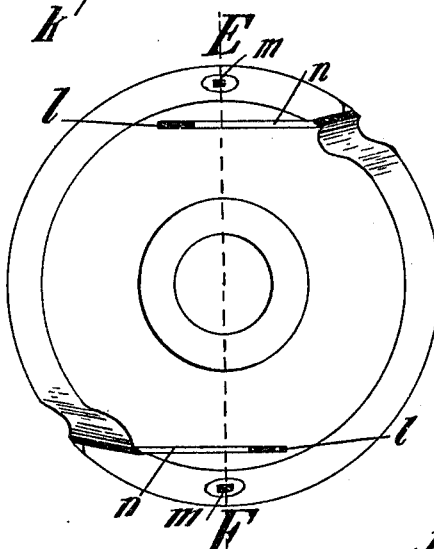
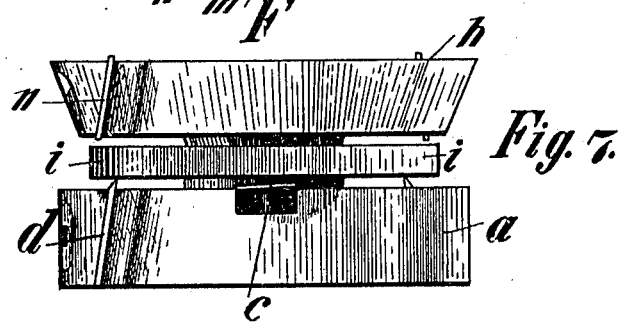
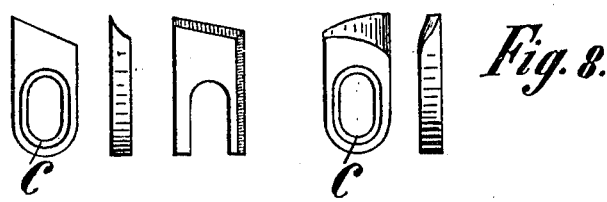

UNITED STATES PATENT OFFICE.

KARL JAKOB SPIETH, OF OBERESSLINGEN, GERMANY.

WOODWORKING-CUTTER.

947,462.　　　　　Specification of Letters Patent.　　Patented Jan. 25, 1910.

Application filed February 15, 1909. Serial No. 477,873.

*To all whom it may concern:*

Be it known that I, KARL JAKOB SPIETH, a subject of the King of Würtemberg, and resident of Oberesslingen, Kingdom of Würtemberg, Germany, have invented certain new and useful Improvements in Woodworking-Cutters, of which the following is a specification.

The present invention relates to a wood working cutter which is destined to simultaneously serve as a tonguing cutter and as a scoring cutter.

It has already been proposed to provide the tonguing cutters for window-frames etc. with a circular saw for obtaining a sharp angular notch. This arrangement suffers however from the inconvenience that the cutting tools cannot be adjusted the one with regard to the other in the proper manner and further that if the knives become shorter, the circular saw had to be completely filed off.

According to the present invention all the operations connected with the tonguing and scoring of the window- or door-frames are simultaneously executed, each cutting tool of the device being adapted to be adjusted independently of the others. The cutting tools, instead of being superposed, are alternatingly arranged the one with regard to the other so as to prevent the obstruction of the cutting-faces by shavings and they are further placed obliquely to the cutting face with a view to obtain a uniform and gradual cut.

The several parts of this improved tool can be removed independently the one from the others and spacing washers of convenient size can be placed between the cutter heads to obtain upon the workpiece plane parts between the parts acted upon by the tools. This spacing washer further permits to round off certain parts of the workpiece which can be guided along said intermediate piece. The scoring cutters are supported so that their rear end is countersunk, the point being thus always at the same height even if the knife has to be sharpened, or filed off.

In the accompanying drawings the improved tool is shown.

Figure 1 represents in ground plan the tonguing cutter. Fig. 2 is a section on line A—B of Fig. 1. Fig. 3 is a section on line C—D of Fig. 1. Fig. 4 represents the spacing washer. Fig. 5 is a section through the scoring cutter. Fig. 6 is a ground plan of Fig. 5. Fig. 7 represents the combined tools. Fig. 8 shows several forms of scoring blades.

The improved tool is combined of a cutter head $a$ which has a central boring for the spindle of the machine, and which carries the scoring cutters $c$ and the blades $d$ for the rabbets. The scoring cutters are adjustably mounted in their guide-grooves $e$ in which they are maintained by means of set screws $f$. The upper edges of the blades $d$ are beveled or sharpened and the blades are located in separate slots $g$ in which they can be adjusted and maintained by set screws $h$. In the disk face adjacent to said blades there are hollows adapted to receive the shavings. The spacing washer $i$ to be placed upon cutter head $a$ which may be of any convenient size and dimension is to be placed upon cutter head $a$ and, of course provided with a central boring. The cutter head $k$ carries the tonguing blades $n$ which are located in incisions $l$ of the support so that they can be easily adjusted and they are maintained in position by means of set screws $m$. Upon the lower surface of the upper cutter head $k$ as well as upon the lower surface of the spacing washer $i$ a circular collar is arranged, which collars determine the width of the plane parts of the work piece which penetrate into the hollows formed by said collars.

The cutters may be of suitable shape and dimensions according to the work to be executed. The spindle upon which the tool is to be fixed may be vertical or horizontal.

I claim:—

An improved wood working cutter comprising in combination an upper cutter head having a central boring for the spindle of the lathe and oblique slots, the tonguing blades adjustably mounted in said slots and a circular collar upon the lower surface of said cutter head; the spacing washer having a central bore and the circular collar projecting from the lower surface of said spacing washer; the lower cutter head having a central bore and oblique slots and incisions in the upper surface hollows being provided adjacent to said incisions, the scoring blades adjustably located in said oblique slots and the blades for the rabbets adjustably mounted in said incisions, substantially as described and shown and for the purpose set forth.

In witness whereof I have hereunto set my hand in the presence of two witnesses.

KARL JAKOB SPIETH.

Witnesses:
ALFRED GAUCH,
WILHELM E. MEIER.